United States Patent [19]

Barman

[11] 4,266,274
[45] May 5, 1981

[54] MICROPROCESSOR-BASED ENGINE CONTROL SYSTEMS

[75] Inventor: Alan W. Barman, Oak Park, Mich.

[73] Assignee: The Bendix Corporation, Southfield, Mich.

[21] Appl. No.: 881,925

[22] Filed: Feb. 27, 1978

[51] Int. Cl.³ .................. F02B 75/10; F02D 78/00; H03K 13/20
[52] U.S. Cl. .................. 364/431; 60/276; 73/1 G; 123/417; 123/440
[58] Field of Search .............. 364/424, 431, 442; 340/347 AD, 347 NT, 347 CC; 123/32 EA, 32 EC, 32 EE, 119 EC, 119 R; 60/276, 277, 285

[56] References Cited

U.S. PATENT DOCUMENTS

| | | | |
|---|---|---|---|
| 3,875,907 | 4/1975 | Wessel | 123/119 R |
| 3,893,103 | 7/1975 | Prill | 340/347 CC |
| 3,893,432 | 7/1975 | Krupp et al. | 123/32 EA |
| 3,909,601 | 9/1975 | Yamawaki et al. | 364/442 |
| 3,961,325 | 6/1976 | Kendall et al. | 340/347 CC |
| 3,978,348 | 8/1976 | Henninger et al. | 340/347 NT |
| 4,094,186 | 6/1978 | Wessel | 60/277 |
| 4,099,495 | 7/1978 | Kiencke et al. | 364/442 |
| 4,103,649 | 8/1978 | Matumoto et al. | 123/119 EC |
| 4,112,893 | 9/1978 | Anzai | 123/119 EC |
| 4,114,570 | 9/1978 | Marshak et al. | 123/32 EA |
| 4,121,554 | 10/1978 | Sueishi et al. | 123/119 EC |
| 4,135,381 | 1/1979 | Sherwin | 60/276 |
| 4,153,023 | 5/1979 | Asano et al. | 123/119 EC |
| 4,167,163 | 9/1979 | Möder | 123/32 EE |
| 4,172,432 | 10/1979 | Wessel et al. | 123/32 EE |

Primary Examiner—Felix D. Gruber
Attorney, Agent, or Firm—Gaylord P. Haas, Jr.; Russel C. Wells

[57] ABSTRACT

A method and apparatus for controlling the various functions of an internal combustion engine using a program-controlled microprocessor having a memory preprogrammed with various control laws and associated control schedules receives information concerning one or more engine-operating parameters such as manifold absolute pressure, throttle position, engine coolant temperature, air temperature, and engine speed or period or the like. These parameters are sensed and then supplied to input circuits for signal conditioning and conversion into digital words usable by the microprocessor. The microprocessor system computes one or more digital command word indicative of a computer-commanded engine control operations and output circuitry responds to predetermined computer-generated commands and to the computed digital command words for converting them to corresponding pulse width control signals for controlling such engine operations as fuel-injection, ignition timing, proportional and/or on-off EGR control, and the like.

More particularly this disclosure relates to an improved microprocessor-based engine control system for controlling both fuel and ignition wherein an exhaust gas sensor is periodically sampled for the integrity of its output signals. In addition, an A/D converter having a novel window which is used in the engine control system and the digital control of ignition signals is also described.

22 Claims, 225 Drawing Figures

Oxygen System Integrator Circuitry

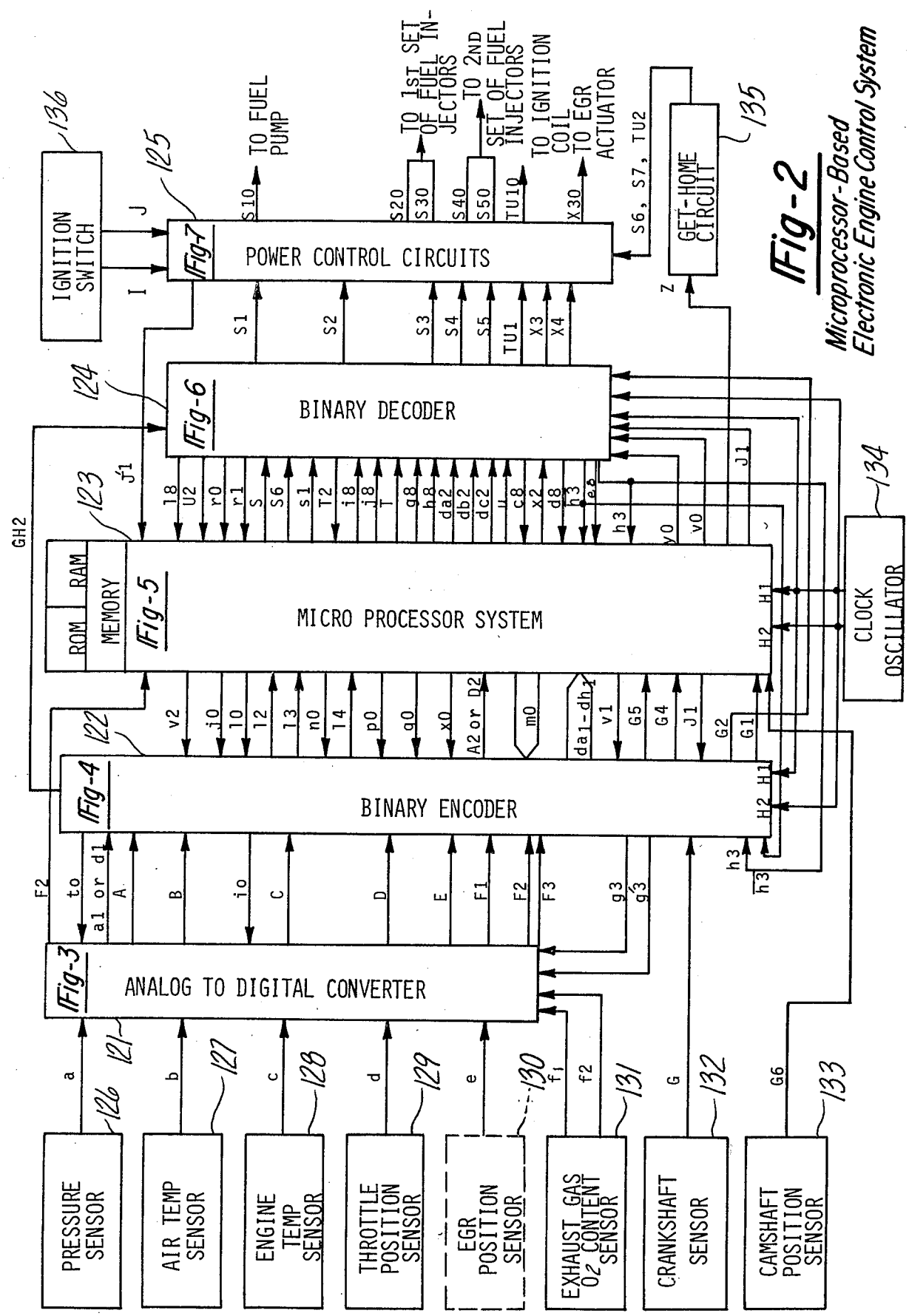

Oxygen System Integrator Circuitry

MICROPROCESSOR-BASED ENGINE CONTROL SYSTEMS

BACKGROUND OF THE INVENTION

1. Field of the Invention

This invention relates generally to a method and apparatus for controlling an internal combustion engine and more particularly to a microprocessor-based electronic engine control system having a memory preprogrammed with various control laws and control schedules responsive to one or more sensed engine-operating parameters for computing command signals for controlling fuel injection, ignition timing, EGR control, or the like.

2. Statement of the Prior Art

Many of the patents of the prior art recognize the need for employing the enhanced accuracy of digital control systems for more accurately controlling one or more functions of an internal combustion engine.

U.S. Pat. No. 3,969,614 which issued to David F. Moyer, et al on July 13, 1976 is typical of such systems as are U.S. Pat. No. 3,835,819 which issued to Robert L. Anderson, Jr. on Sept. 17, 1974; U.S. Pat. No. 3,904,856 which issued to Louis Monpetit on Sept. 9, 1975; and U.S. Pat. No. 3,906,207 which issued to Jean-Pierre Rivere, et al on Sept. 16, 1975. All of these patents represent a break-away from the purely analog control systems of the past, but neither the accuracy, reliability, or number of functions controlled is sufficient to meet present day requirements.

Future internal combustion engines will require that emissions be tightly controlled due to ever-increasing governmental regulation, while fuel consumption is minimized and drivability improved over the entire operating range of the engine. None of the systems of the prior art provide a method and apparatus for controlling the operation of an internal combustion engine over its entire operating range with sufficient accuracy to attain minimal emissions and minimal fuel consumption together with improved drivability.

The systems prior art attempt to control one or more of the engine-operating functions but none attempts to control the operation of the fuel pump, fuel injection, engine ignition timing, on-off and/or proportional EGR control, and the like while using feedback from such devices as oxygen sensors for emission control purposes or for effecting a closed loop fuel control operations, while yet further including provisions for optimizing acceleration enrichment handling, and the like. Moreover, the systems of the prior art are extremely expensive, often too large to install, difficult to repair and maintain and are, therefore, not commercially feasible at the present time.

These and other problems of the prior art are at least partially solved by the Applicant's improvements in microprocessor-based electronic engine control systems which enable the improved systems to eliminate most or all of the problems of the prior art. The improvements set forth herein enable the implementation of a microprocessor-based electronic engine control system capable of executing much more advanced and complex fuel control laws than heretofore achievable in the prior art and enable the engine control system to expand the number of control functions performed thereby while, at the same time, reducing the cost and size of the unit and increasing reliability so as to render the system commercially feasible.

The analog-to-digital conversion circuitry with window counter and feedback compensation is a highly efficient low cost means for implementing the required A/D conversion while greatly increasing the accuracy of the conversion over any of the systems of the prior art. The oxygen feedback sampler described herein avoids the problems inherent in the prior art such as a loss of accuracy due to invalid signals from cold sensors. The system of the present invention avoids the problems of the prior art and provides a greatly improved method and apparatus for sampling oxygen sensors wherein, the sensors are sampled at a rate which changes as the engine speed changes and the samples are taken periodically at a rate sufficient to enable the sampling to always be accomplished in one revolution or less.

Furthermore, the prior art teaches many highly inaccurate methods for controlling ignition timing and most of these systems prove totally unreliable when the engine is in a "cranking" mode operation. The ignition timing system of the present invention avoids the problems of the prior art by controlling the timing of firing pulses to the spark plugs by generating two separate programgenerated ignition control words. One control word may be used to calculate an ignition delay from the occurrence of an engine position pulse until the time of the spark and the second word controls the ignition pulse-width thereby determining the duration of the spark. A solution to the unreliability problem during the "cranking mode" of operation is also included herein.

These and other objects and advantages of the present invention will be accomplished by the method and apparatus of the present invention which cooperate to produce an improved engine control system far superior to any heretofore known in the prior art.

SUMMARY OF THE INVENTION

A first improvement in the microprocessor-based engine-control system relates to the use of an analog-to-digital converter with a window counter and feedback compensation. This system includes the use of a window time whose width is a constant equal to a value slightly larger than the time normally required for the converter ramp to reach the value of the largest expected sensor voltage. The counter that accumulates the value of the sensor stops when the ramp voltage reaches the value of the sensor but is allowed to restart if the sensor voltage is higher than the ramp at any time during the window so that a noise pulse which momentarily decreases sensor voltage below the voltage at the ramp will not permanently stop the counter.

The oxygen feedback sensor sampler of the present invention employs means for sampling an oxygen sensor at a rate which changes as the engine speed changes and the rate is updated once every cylinder so that it will respond well to sudden accelerations or decelerations. The oxygen feedback sensor sampler allows the microprocessor to programmably determine the time during which the oxygen sensor is to be tested but makes the test time a relatively short time to allow sufficient time for highly accurate rich/lean measurements to be made.

The ignition timing process delay controller of the present invention includes sensing means mounted on the engine so that an engine position pulse occurs each time one of the cylinders is near a predetermined position, such as top dead center. An ignition delay counter means counts a predetermined delay from the occurrance of an engine position pulse until the time of the spark and ignition pulse-width counter means determines the duration of said spark. In the event that two sparks are required to start in the interval between two engine position pulses, the microprocessor is allowed to start a second delay after the first is completed using the same counter since means are provided for detecting a command from the processor and starting the delay counting means again after it is completed counting for the retarded spark condition.

Lastly, the ignition timing controller of the present invention includes sensor means mounted on the engine for detecting an engine position pulse each time one of the cylinders is near a predetermined position. A first counter means is used for computing ignition delay and a second counter means is used for computing ignition pulse-width. The microprocessor sends data to the counting means and if the program is not fast enough to send new data into the counters, the previous value will still be held there to be reused. The spark plugs are controlled by the ignition firing pulse and this pulse starts when the ignition delay is counted down and ends when the ignition pulse-width is counted down. The unique circuitry associated with the first and second counting means allows relatively small counters to be utilized with high resolution for obtaining extremely accurate ignition timing control.

INCORPORATION BY REFERENCE

This application is one of fourteen applications filed on Feb. 27, 1978, all commonly assigned and having substantially the same specification and drawings, the fourteen applications being identified below:

| Serial Number | Title |
|---|---|
| 881,321 | Microprocessor-Based Electronic Engine Control System |
| 881,322 | Feedback-Compensated Ramp-Type Analog to Digital Converter |
| 881,323 | Input/Output Electonic For Microprocessor-Based Engine Control System |
| 881,324 | Switching Control of Solenoid Current in Fuel injection Systems |
| 881,921 | Dual Voltage Regulator With Low Voltage Shutdown |
| 881,922 | Oxygen Sensor Qualifier |
| 881,923 | Ratiometric Self-Correcting Single Ramp Analog To Pulse Width Modulator |
| 881,924 | Microprocessor-Based Engine Control System Acceleration Enrichment Control |
| 881,925 | Improvements in Microprocessor-Based Engine Control Systems |
| 881,981 | Oxygen Sensor Feedback Loop Digital Electronic Signal Integrator for Internal Combustion Engine Control |
| 881,982 | Improvements in Electronic Engine Controls System |
| 881,983 | Electronic Fuel Injection Compensation |
| 881,984 | Ignition Limp Home Circuit For Electronic Engine Control Systems |
| 881,985 | Oxygen Sensor Signal Conditioner |

Application Ser. No. 881,321, now U.S. Pat. No. 4,255,789 has been printed in its entirety and the specification of that application is specifically incorporated by reference. For a better understanding of the drawing figures in this application, reference is made to the same figure numbers in the above mentioned application, Ser. No. 881,321 which includes FIGS. 1 to 10.34.

BRIEF DESCRIPTION OF THE DRAWINGS

FIG. 2 is a block diagram of the microprocessor-based electronic engine control system.

Figure 4D:
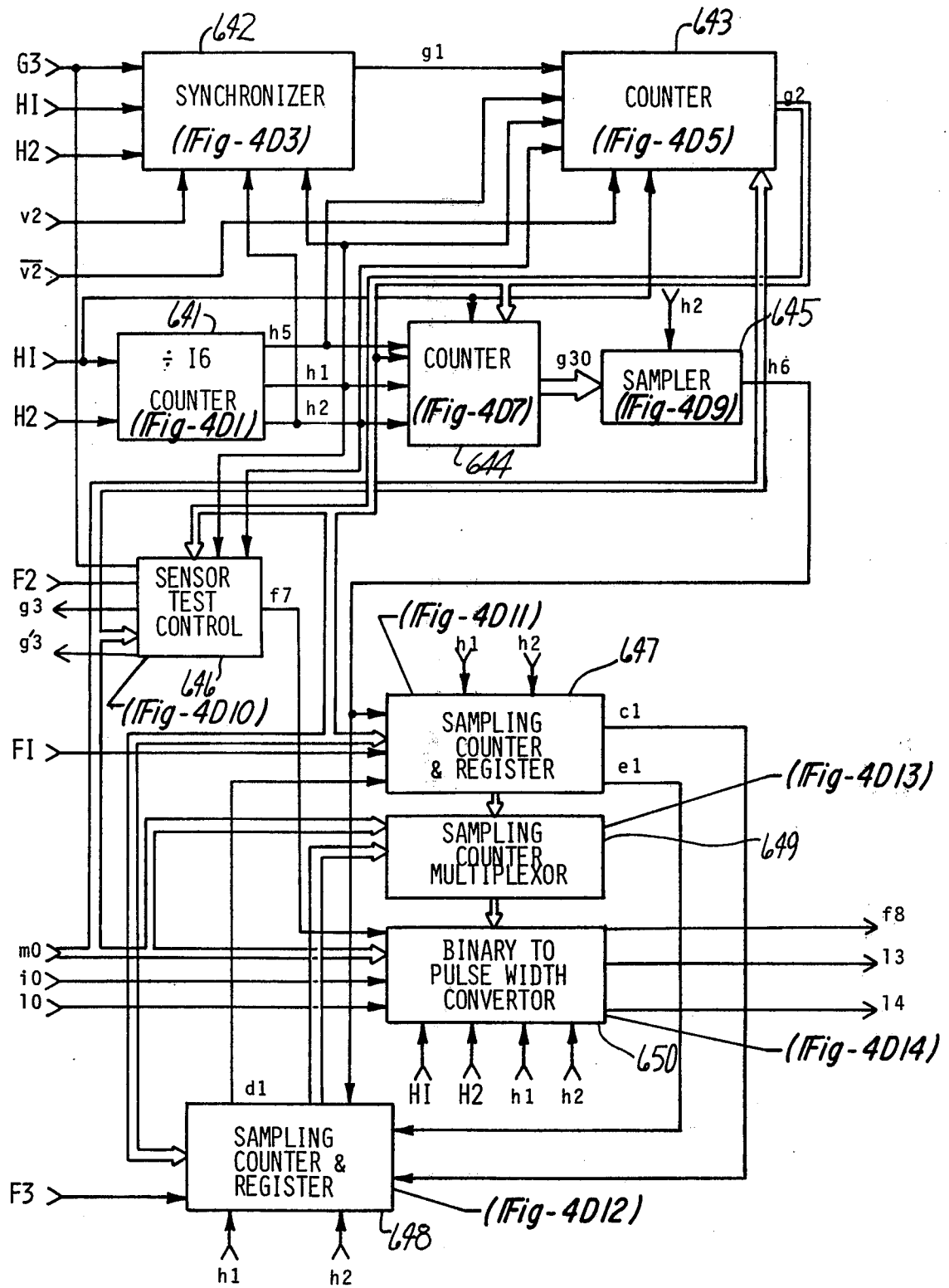
FIG. 4D is a block diagram of the oxygen system integrator circuitry.

I claim:

1. In an internal combustion engine having an engine block, a plurality of cylinders disposed in said engine block, a piston mounted for reciprocal movement within each of said plurality of cylinders in response to the combustion of air and fuel therein means responsive to a fuel control signal for controlling the supply of fuel into one or more of the plurality of cylinders, ignition control means responsive to an ignition control signal for controlling the ignition of the fuel within the one or more cylinders, the improvement comprising a microprocessor-based electronic control system for generating at least one of the fuel control signals and the ignition control signal, the engine control system including:

means for sensing at least one of a plurality of engine-operating parameters and generating an analog output signal indicative thereof;

a program-controlled microprocessor means including a memory means for storing look-up tables of control values and a program means for implementing one or more control laws;

analog-to-digital converter means responsive to a selected one of said analog output signals for converting same into a digital data word indicative thereof, said analog-to-digital converter means including means for generating a predetermined window time during which said conversion occurs, and said analog-to-digital converter means being responsive to a temporary termination of the analog output signal being converted into said digital data word due to noise signal conditions which occur within said window time to enable continuation of said conversion process as soon as said noise signal condition ceases to exist;

said microprocessor means being responsive to said digital data word indicative of the value of a selected one of said analog output signals for addressing said memory means to one or more of said stored look-up tables and executing one of said program-implemented control laws to calculate a program-generated control command; and means responsive to said control command for generating at least one of the fuel control signal and the ignition control signal.

2. An analog-to-digital converter for converting an analog input signal into a binary number indicative thereof, said converter comprising:

means for generating a ramp voltage;

comparator means for comparing said analog input signal to said generated ramp voltage and for outputting a DC voltage level so long as the value of said analog input signal is greater than the value of said ramp voltage;

means for generating clock pulses;

binary counter means responsive to said DC voltage level and said clock pulses for generating a binary number indicative of the time during which said binary counter means is allowed to count; and window counter means responsive to said clock pulses for generating a predetermined window time interval whose duration is a constant equal to slightly larger than the time normally required for said ramp-generated voltage to reach the value of the largest expected analog input signal voltage said window counter means controlling the operation of said binary counter means so that even if the value of said analog input signal momentarily drops below the value of said ramp voltage during the period of said window time interval, said counter means will resume its count as soon as the value of said analog input signal voltage is again larger than the value of the ramp voltage and said window time interval has not yet expired.

3. In an analog-to-digital converter for converting an analog input signal into a binary number, an improved method of conversion comprising the steps of:

generating a reset pulse;

initiating the generation of a ramp voltage following said reset pulse;

counting a first predetermined window of time beginning with said reset pulse and ending with a correction feedback pulse;

comparing the analog input signal with said generated ramp voltage for outputting a DC voltage as long as the value of the analog input signal is greater than the value of said generated ramp voltage;

generating clock pulses;

counting said clock pulses in a binary counter means responsive to said DC voltage for generating a binary number indicative of the number of counts accumulated while said DC voltage is outputted and said window of time has not yet elapsed, said window of time normally being made slightly larger than the time required for the binary counter means to reach the maximum value corresponding to the largest expected analog input signal voltage so that the binary counter means will count during all the time interval that the analog input signal voltage is greater than said ramp voltage even if the analog input signal voltage should have noise spikes thereon that temporarily extend to smaller values than the value of said ramp voltage thereby permitting said binary counter to resume counting if the value of the analog input signal again exceeds the value of the generated ramp voltage during said window of time; and determining the rate of generation of said ramp voltage for detecting whether said ramp voltage has attained a predetermined desired voltage level at a particular point in time and selectively altering the rate of generation of said ramp to automatically compensate therefor.

4. An A/D conversion system comprising:

means for generating a ramp reset signal;

ramp capacitor means responsive to said ramp reset signal for discharging the charge stored thereon and attaining a predetermined initial reference state and being further responsive to a charging current for generating a ramp voltage signal;

means responsive to a control signal for generating said charging current;

feedback comparator means responsive to a reference count signal for comparing said ramp voltage signal with a predetermined reference voltage indicative of the desired value which said ramp voltage signal should have reached at the time of said reference count signal and outputting a pulse-width signal whose duration is proportional to the amount by which the rate of generation of said ramp voltage signal is in error;

feedback compensation means coupled to the output of said feedback comparator means and responsive to the pulse-width output signal therefrom for selectively varying the value of said control signal to control the rate of generation of said control current;

A/D comparator means having a first input coupled for receiving an analog input signal to be converted and a second input coupled to receive said ramp voltage signal and an output, the output of said A/D comparator means normally being in a first output state until said ramp capacitor means has begun generating said ramp voltage signal, for being in a second output stage as long as a value of said ramp voltage signal is less than the value of said analog input signal and for again switching to said first output state as soon as the value of said ramp voltage signal becomes equal to or greater than the value of said analog input signal, the measured pulse-width duration of said second output state being indicative of and proportional to a measure value of said analog input signal;

means for generating a series of clock pulses;

first counter means responsive to a signal indicating that said ramp capacitor means has attained said predetermined initial reference state for clearing same and being responsive to the output of said A/D comparator means being in said second output state for counting said clock pulses until the output of said A/D comparator means switches again to said first state to terminate the counting of said clock pulses, the total count accumulated in said first counter means upon the termination of said counting of clock pulses representing a digital word indicative of the value of said input analog signal;

second counter means responsive to said signal indicating that said ramp capacitor means has attained said predetermined initial reference state for counting said clock pulses for a predetermined count time interval which is selected to be of a duration longer than the longest time interval it would normally take said first counter means to reach the maximum value corresponding to the largest expected analog input signal to be converted;

decoding means coupled to the output of the said second counter means for detecting the attainment of a predetermined reference count and generating said reference count signal indicative thereof for initiating said ramp feedback comparator means; and noise immunity circuit means responsive to said second counter means being within said predetermined count time interval for automatically resuming the counting of said clock pulses by said first counter means even though said counting was momentarily terminated by transient noise signals so as to cause the output of said A/D comparator means to momentarily switch back to said first state because the value of said ramp voltage signal appeared to be momentarily greater than or equal to the value of said analog signal thereby improving conversion accuracy and reliability by allowing said first counter means to count substantially all of the time period during which the value of said ramp voltage signal is less than the value of said analog input signal regardless of the relatively momentary value effect that transient noise signals have on said analog input signal.

5. The A/D conversion system of claim 4 wherein said ramp capacitor means includes a ramp capacitor coupled between said means for generating a charging current and a reference level and a normally non-conducting switching means coupled across said ramp capacitor and responsive to said reset signal for discharging said ramp capacitor and sinking the current generated by said means for generating charging current until said ramp reset signal terminates, the duration of said ramp reset signal being sufficiently long to insure that said ramp capacitor is fully discharged and that the value of said ramp voltage signal is at said predetermined initial reference state.

6. The A/D conversion system of claim 5 wherein said feedback comparator means includes a feedback comparator having first and second inputs and a feedback comparator output, means for coupling said ramp capacitor means to said first input for supplying said ramp voltage signal thereto, voltage divider means coupled between a source of potential and a reference voltage level for normally establishing a predetermined reference voltage at a voltage divider node, said predetermined reference voltage being indicative of the desired value which said ramp voltage signal should have reached at the time said predetermined reference count is attained if the rate of generation of said ramp voltage signal is correct, said voltage divider node being operatively coupled to said second input, normally-conducted switching means coupled between said voltage divider node and ground for normally grounding said second input such that the signal at said first input is normally greater causing said feedback comparator output to be normally in said first state, said switching means being responsive to said predetermined reference count signal for switching to a nonconducting state to enable said second input to receive said predetermined reference voltage such that said feedback comparator output switches to said second output state until the value of said ramp voltage signal becomes equal to or greater than the value of said predetermined reference voltage at which time the output of said feedback comparator again switches back to said first output state.

7. The A/D conversion system of claim 4 wherein said means for generating a charging current includes a transistor means normally operating in its linear range and having its current-carrying electrodes coupled between a source of potential and said ramp capacitor means for controlling the flow of charging current thereto, the control signal at the control electrode of said transistor means being operative to selectively vary the conduction thereof and wherein said feedback comparator means includes an RC circuit means coupled between the output of said feedback comparator and the control electrode of said transistor means, said RC circuit means including a holding capacitor for storing said control voltage signal, said RC circuit means being responsive to the pulse-width output of said feedback comparator for converting said pulse-width output into a voltage signal for selectively varying the charge on said holding capacitor to change said control signal voltage presented to the control electrode of said transistor means and therefore the conduction of said transistor means for selectively varying the rate at which said ramp voltage signal is generated.

8. The A/D conversion system of claim 4 further including means responsive to said first counter means having attained a predetermined count greater than the maximum expected count for the largest expected analog input signal to be converted for generating a "fault" condition signal in response thereto.

9. A method for converting an analog input signal into a binary number indicative thereof comprising the steps of:
generating a ramp voltage;
comparing said ramp voltage with the analog input signal for generating an output signal indicating that the value of the analog input signal is greater than the value of said ramp voltage;
counting clock signals during said output signal to generate a binary number indicative of the value of the analog input signal;
interrupting said counting of clock signals when said output signal indicates that said ramp voltage is equal to or greater than the analog input signal;
counting clock signals to generate a predetermined time interval whose duration is greater than the longest conversion time expected; and
automatically resuming said first counting of said clock signals when said output signal indicates that the value of the analog input signal is greater than the value of said ramp voltage so long as said predetermined time interval has not expired.

10. The method of claim 9 further including the steps of detecting a predetermined reference count, establishing a predetermined reference voltage indicative of the value which said ramp voltage should have reached if the rate of generation thereof is correct, comparing said generated ramp voltage with said established predetermined reference voltage for generating a correction signal, and selectively varying the rate of generation of said ramp voltage in response to the value of said correction signal to improve the accuracy and reliability of the conversion.

11. In an internal combustion engine having an intake system, an exhaust system, an engine block, a plurality of cylinders disposed in the engine block, a piston mounted for reciprocal movement within each of the plurality of cylinders, means for supplying a controlled quantity of fuel to one or more of the cylinders, means responsive to an ignition control pulse for controlling the ignition of the fuel in a selected one or more of the cylinders, an improved engine control system for controlling ignition timing comprising:
computer means including a program-controlled microprocessor, a memory means for storing a look-up table of control values and a program means for implementing at least one predetermined control law;
means for sensing one or more engine-operating parameters and addressing said memory means in response thereto, said program-controlled microprocessor means being responsive to the particular control value in said addressed memory means for implementing a control law and outputting a first data word indicative of a predetermined computed ignition delay time and a second data word indicative of a predetermined ignition pulsewidth duration;
sensor means for generating an engine position pulse each time one of the pistons is near a predetermined position within its cylinder;

ignition delay counter means responsive to the occurrence of one of said engine position pulses and the ignition delay time indicated by said first data word for counting said predetermined computed ignition delay time to determine the time of ignition; and ignition pulse-width counter means responsive to the termination of said delay time and the pulse-width duration represented by said second data word for counting a predetermined time interval equal to the duration of ignition for generating the ignition control pulse.

12. The improved engine control system for controlling ignition timing of claim 11 further including means responsive to the occurrence of a next succeeding engine position pulse indicating a retarded spark condition and the need for having a second ignition control pulse start in the time interval indicated by said ignition delay counter means for generating the ignition control pulse and means responsive to said generated ignition control pulse for starting another count in said ignition delay counter means after it has completed counting for the retarded spark condition.

13. In an internal combustion engine having an intake system, an exhaust system, an engine block, a plurality of cylinders disposed in the engine block, a piston mounted for reciprocal movement within each of the plurality of cylinders, means for supplying a controlled quantity of fuel to one or more of the cylinders, means responsive to an ignition control pulse for controlling the ignition of fuel in a selected one or more of the cylinders, an improved engine control system for controlling ignition timing comprising:

computer means including a program-controlled microprocessor, a memory means for storing a look-up table of control values and a program means for implementing predetermined control laws;

means for sensing one or more engine-operating parameters and addressing said memory means in response thereto, said computer means being responsive to said control value addressed in said memory means for implementing a control law and computing a first data word indicative of a computed ignition delay time and a second data word indicative of a computed ignition pulse-width duration;

sensor means for generating an engine position pulse each time one of the pistons is near a predetermined reference position within its cylinder;

a first storage register means for holding said first data word indicative of the value of said computed ignition delay time;

an ignition delay counter means associated with said first storage register, said first storage register being responsive to the occurrence of an engine position pulse for transferring the contents of said first storage register into said ignition delay counter means;

a second storage register means for receiving said second data word indicative of the computed value of said ignition pulse-width;

an ignition pulse-width counting means;

said ignition delay counting means beginning to count said delay time upon the transfer of said first data word from said first storage register means and for generating a first signal at the end of the duration thereof, means responsive to said first signal for initiating the ignition control pulse by transferring the contents of said second storage register into said second counter means and initiating the counting thereof such that when the second counter means has attained a termination count at the end of a time interval equal to said ignition pulse-width, the ignition control pulse is terminated thereby controlling the ignition for operating the internal combustion engine.

14. The improved engine control system for controlling ignition timing of claim 13 further including logic means responsive to the generation of the next successive engine position pulse for immediately initiating the ignition control pulse even if said ignition delay counter means is still counting.

15. The improved engine control system for controlling ignition timing of claim 13 further including means for detecting an engine cranking mode of operation and means responsive to the detection of said engine cranking condition for initiating the generation of the ignition control pulse at the time of said engine position pulse thereby allowing the first and second storage register means and said counter means associated therewith to have fewer stages since they are not required to be able to count the long time intervals occurring at the low engine speeds normally associated with the cranking mode of operation.

16. In an internal combustion engine having an intake system, an exhaust system, an engine block, a plurality of cylinders disposed in said engine block, a piston mounted for reciprocal movement within each of said plurality of cylinders, an output shaft rotatively driven by the reciprocal movement of said pistons within said cylinders, oxygen sensor means operatively coupled to said exhaust system for generating a signal indicative of the relative air/fuel ratio existing therein and means responsive to the measured air/fuel ratio in said exhaust system for controllably varying engine operating conditions to change said air/fuel ratio, the improvement comprising sensor means operatively associated with said engine for outputting an engine position pulse each time one of said plurality of pistons approaches a predetermined reference position within its corresponding cylinder, and means for sampling said oxygen sensing means at a rate that bears a constant relationship to the speed of said engine, the temperature of said oxygen sensing means being tested to determine the validity of said sampled measured values at least once each engine revolution, said sampling being a function of said engine position pulses for sampling the value measured by said oxygen sensing means a predetermined number of times between each two of said plurality of cylinders regardless of the number of said cylinders in said engine block.

17. The improved internal combustion engine of claim 16 wherein said means for sampling further includes computer means having a memory and program means stored within said memory for implementing one or more control laws, said computer means being responsive to one or more engine-operating parameters such as engine speed for generating control commands to initiate the sampling of the the oxygen sensor means and to programmably vary the duration and frequency of such sampling.

18. The internal combustion engine system of claim 16 wherein said means for sampling further includes computer means having a memory and programming means stored within said memory for implementing one or more control laws, said computer means being responsive to one or more engine-operating parameters such as engine speed for generating computer commands for programmably controlling the rate at which the oxygen sensor means is sampled to insure that said rate is updated once every cylinder so as to provide improved responsiveness to sudden accelerations and decelerations.

19. The internal combustion engine of claim 16 wherein said means for sampling includes counting means for counting each sampling time that a "rich" air/fuel mixture is detected, count accumulation means for accumulating said counts, and computer means having a memory and program means stored within said memory for implementing one or more control laws, said computer means being responsive to one or more measured engine-operating parameters such as engine speed or the like for generating control commands for programmably varying the duration over which said counts are accumulated within said count accumulation means.

20. In an internal combustion engine having an intake system, an exhaust system, and engine block, a plurality of cylinders disposed in said engine block, a piston mounted for reciprocal movement within each of said plurality of cylinders, an output shaft rotatively driven by the reciprocal movement of said pistons within said cylinders, oxygen sensor means operatively coupled to said exhaust system for generating a signal indicative of the relative air/fuel ratio existing therein and means responsive to the measured air/fuel ratio in said exhaust system for controllably varying engine operating conditions to change said air/fuel ratio, the improvement comprising sensor means operatively associated with said engine for outputting an engine position pulse each time one of said plurality of pistons approaches a predetermined reference position within its corresponding cylinder and means responsive to said engine position pulses for sampling the value measured by said oxygen sensing means a predetermined number of times between each of two of said plurality of cylinders regardless of the number of said cylinders in said engine block so that the sampling rate bears a constant relationship to the speed of said engine and the temperature of said oxygen sensing means can be tested to determine the validity of said sampled measured values at least once each engine revolution, said means for controlling said engine-operating parameters including computer means having a memory and program means stored within said memory for implementing one or more control laws, said computer means being responsive to one or more engine-operating parameters such as engine speed for generating control commands to initiate the testing of the temperature of said oxygen sensor means and to programmably vary the duration and frequency of such temperature tests.

21. In an internal combustion engine having an intake system, an exhaust system, an engine block, a plurality of cylinders disposed in said engine block, a piston mounted for reciprocal movement within each of said plurality of cylinders, an output shaft rotatively driven by the reciprocal movement of said pistons within said cylinders, oxygen sensor means operatively coupled to said exhaust system for generating a signal indicative of the relative air/fuel ratio existing therein and means responsive to the measured air/fuel ratio in said exhaust system for controllably varying engine operating conditions to change said air/fuel ratio, the movement comprising sensor means operatively associated with said engine for outputting an engine position pulse each time one of said plurality of pistons approaches a predetermined reference position within its corresponding cylinder and means responsive to said engine position pulses for sampling the value measured by said oxygen sensing means a predetermined number of times between each two of said plurality of cylinders regardless of the number of said cylinders in said engine block so that the sampling rate bears a constant relationship to the speed of said engine and the temperature of said oxygen sensing means can be tested to determine the validity of said sampled measured values at least once each engine revolution, said means for controlling said engine-operating parameters including computer means having a memory and programming means stored within said memory for implementing one or more control laws, said computer means being responsive to one or more engine-operating parameters such as engine speed for generating computer commands for programmably controlling the rate at which said oxygen sensor means is sampled to insure that said rate is updated once every cylinder so as to provide improved responsiveness to sudden accelerations and decelerations.

22. In an internal combustion engine having an intake system, an exhaust system, an engine block, a plurality of cylinders disposed in said engine block, a piston mounted for reciprocal movement within each of said plurality of cylinders, an output shaft rotatively driven by the reciprocal movement of said pistons within said cylinders, oxygen sensor means operatively coupled to said exhaust system for generating a signal indicative of the relative air/fuel ratio existing therein and means responsive to the measured air/fuel ratio in said exhaust system for controllably varying engine operating conditions to change said air/fuel ratio, the improvement comprising sensor means operatively associated with said engine for outputting an engine position pulse each time one of said plurality of pistons approaches a predetermined reference position within its corresponding cylinder and means responsive to said engine position pulses for sampling the value measured by said oxygen sensing means a predetermined number of times between each two of said plurality of cylinders regardless of the number of said cylinders in said engine block so that the sampling rate bears a constant relationship to the speed of said engine and the temperature of said oxygen sensing means can be tested to determine the validity of said sampled measured values at least once each engine revolution, the condition of said oxygen sensor means being sampled and counted each time a "rich" air/fuel mixture is detected and said sampling means including means for accumulating said counts, and said means for controlling said engine-operating parameters including computer means having a memory and program means stored within said memory for implementing one or more control laws, said computer means being responsive to one or more measured engine-operating parameters such as engine speed or the like for generating a set of control commands for programmably varying the duration over which said counts are accumulated within said count accumulation means.

* * * * *